United States Patent Office 3,720,375
Patented Mar. 13, 1973

3,720,375
AUTOMATIC SPRINKLING APPARATUS
Hiromu Kumaoka, 227 Tokuda, Kibi-cho,
Arita-gun, Wakayama-ken, Japan
Filed Apr. 23, 1971, Ser. No. 136,893
Int. Cl. B05b 3/00
U.S. Cl. 239—210                                    2 Claims

ABSTRACT OF THE DISCLOSURE

An apparatus comprising a vertical tube connected at its lower end to a source for supplying a liquid to be sprinkled, at least one horizontal tube connected to the upper end of the vertical tube and adapted to be rotated about the axis of the vertical tube so as to conduct the liquid from the vertical tube in a horizontal direction, at least one downward tube connected to the distal end of the horizontal tube for conducting the liquid downward and jet means mounted on the lower end of the downward tube for forcing out the liquid from the downward tube while being automatically rotated or pivotally moved by the energy of the discharged liquid and causing the reaction force of the discharged liquid to act on the horizontal tube as a torque therefor. The jets of liquid are sent out from the apparatus in highly three-dimensional manner for uniform application of the liquid to fruit trees.

The present invention relates to an apparatus for automatically sprinkling water or solutions of agricultural chemicals or the like onto fruit trees.

Automatic sprinklers heretofore provided have the disadvantage that they are very complex in structure and costly to manufacture. Further although conventional devices are capable of applying a chemical solution or the like to fruit trees almost uniformly over the entire peripheral portions thereof, the mode of application is rather planar and it is impossible for the known devices to sprinkle the liquid uniformly onto both front and rear faces of the leaves and over the entire peripheral surface of fruit. Accordingly, insecticidal operation with agricultural chemicals can not be achieved with satisfactory results, or application of fertilizers will not be provided for every part of trees to full extent and reduction in the yield of fruit will therefore result.

While the insects on the leaves of fruit trees have conventionally been controlled by a spray of agricultural chemicals, this method involves a possible contamination of the fruit with some chemical components retained thereon. For this reason, it is desired to remove insects by a physical method, as by a jet of water to drive the insects off the leaves, but since conventional sprinkling devices are incapable of applying a liquid with full uniformity, it is impossible to practice such method with satisfactory effects.

An object of the present invention is to provide an automatic sprinkling apparatus which is very simple in structure and inexpensive to manufacture.

Another object of this invention is to provide an automatic apparatus for sprinkling a liquid three-dimensionally onto all portions of fruit trees including their leaves and fruit.

Still another object of this invention is to provide an automatic sprinkling apparatus for controlling or removing the insects on the leaves of fruit trees physically and effectively.

These and other object of the present invention will become more apparent from the following description.

The present invention provides an automatic sprinkling apparatus comprising a vertical tube connected at its lower end to a source for supplying a liquid to be sprinkled, at least one horizontal tube connected to the upper end of the vertical tube and adapted to be rotated about the axis of the vertical tube so as to conduct the liquid from the vertical tube in a horizontal direction, at least one downward tube connected to the distal end of the horizontal tube for conducting the liquid downward, and jet means mounted on the lower end of the downward tube for forcing out the liquid from the downward tube while being automatically rotated or pivotally moved by the energy of the discharged liquid and causing the reaction force of the discharged liquid to rotate on the horizontal tube.

In accordance with the automatic sprinkling apparatus of this invention, the energy of the liquid forced out from the jet means is utilized as a power source for automatically rotating or moving pivotally the jet means itself as well as for automatically rotating the horizontal tube, so that there is no need to employ a special device for driving the jet means and the horizontal tube. Accordingly, the apparatus is very simple in overall structure and inexpensive to manufacture. The simple structure further ensures trouble-free operation and easy maintenance. Since the jet means itself is rotated or pivotally moved while being orbitally moved about the tree due to the rotation of the horizontal tube, the liquid can be sprinkled onto the tree in highly three-dimensional manner to achieve uniform application of the liquid to every portions of the entire tree. When supplied with insecticides, the present apparatus can completely control insects, while application of fertilizers will be conducted uniformly over the entire tree to result in a higher yield of fruit. Moreover, uniform application of a liquid, thus effected over the entire tree including the front and rear faces of leaves and fruit, ensures further advantage that, when a jet of water is forced out onto leaves, insects will be almost completely driven off the leaves physically and yet effectively.

For a better understanding of the features of this invention, embodiments of the invention will be described below with reference to the drawings, in which.

Figure 1:
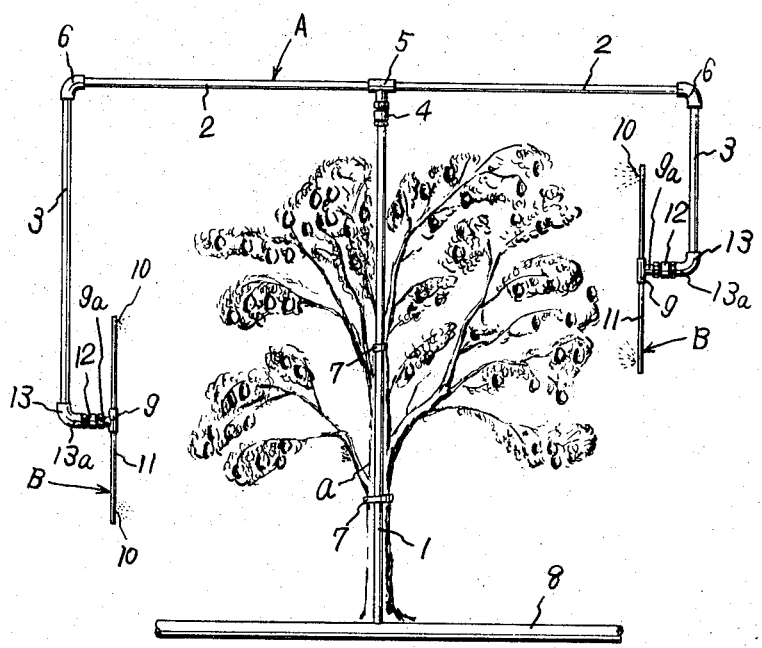
FIG. 1 is a front view showing an embodiment of this invention wherein swivel type jet means is employed.
Figure 3:
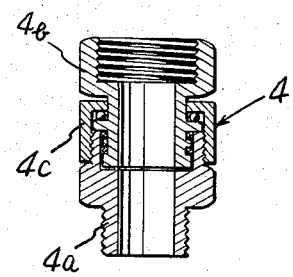
FIG. 3 is an enlarged view in vertical section showing a swivel joint used in the above embodiment.
Figure 4:
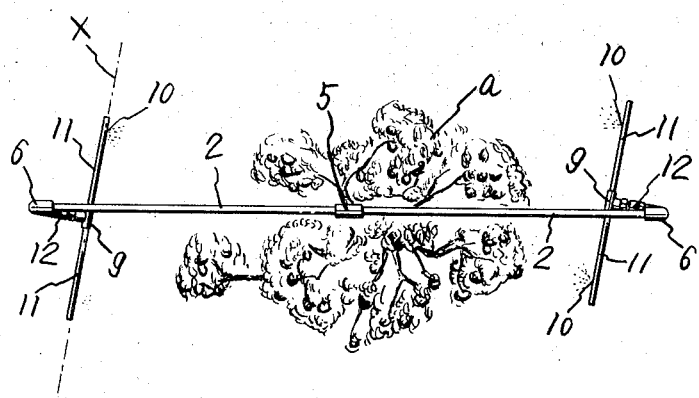
FIG. 4 is a plan view of the same embodiment as a swivel tube is rotated 90 degrees from the position shown in FIG. 2.
Figure 7:
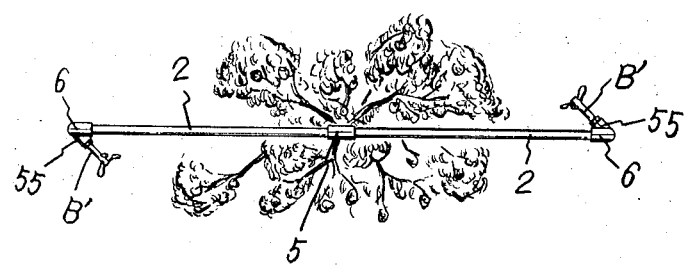
FIG. 7 is a plan view of the same.
Figure 5:
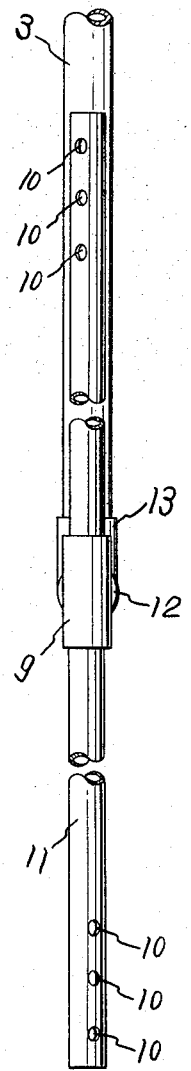
FIG. 5 is an enlarged view of the swivel tube used in the embodiment in FIG. 2 as it is seen from the side of a fruit tree.

In the drawing, indicated at A is liquid supply means and at B, jet means. The liquid supply means A is disposed in an upright position along the trunk of fruit tree $a$ and comprises a vertical tube 1 connected at its lower end to a source for supplying a liquid to be sprinkled, horizontal tubes 2 connected to the upper end of the vertical tube 1 and adapted for rotation about the axis of the tube 1 for conducting the liquid from the vertical tube 1 in horizontal direction, and downward tubes 3 connected to the end of the horizontal tubes 2 for guiding the liquid downward from the horizontal tubes 2. The vertical tube 1 and horizontal tubes 2 are joined together by a swivel joint 4 and a T-joint 5, while the horizontal tubes 2 and the downward tubes 3 are joined together by elbows 6. The vertical tube 1 is fastened to the trunk of the fruit tree $a$, for example, by a band 7 in fixed position, with its lower end connected to a liquid conduit 8 further connected at its one end to an unillustrated liquid tank equipped with a feed pump. The means for fastening the vertical tube 1 to the trunk and the means for supplying the liquid to the lower end of the vertical tube 1 may not be limited to the illustrated members. The swivel joint 4 shown in FIG. 3 comprises a base tube 4$a$ to be screwed into the upper end of the vertical tube 1, a rotary tube 4$b$ rotatably connected to the base tube 4$a$ and to be connected to the T-joint 5 in screw-thread engagement therewith, and a holding tube 4$c$ for joining the rotary tube 4$b$ to the base tube 4$a$. The swivel joint 4 may be of any other desired construction. Only one or a plurality of horizontal tubes 2 may be connected to the vertical tube 1 in a plane in radial arrangement. In the illustrated embodiment, a pair of horizontal tubes are used. In the case where a plurality of horizontal tubes 2 are employed, the downward tubes 3 to be fixed to the ends of the tubes 2 may preferably be of varying lengths as shown in FIG. 1, which ensures liquid application over a wider area in vertical direction.

Figure 2:
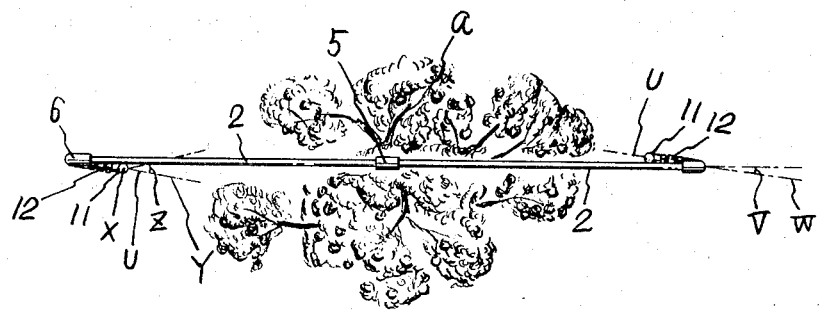
FIG. 2 is a plan view of the same.

The jet means B comprises a tubular joint 9 and swivel tubes 11 formed with at least one orifice 10 and connected to the joint 9. The drawings show the swivel tube 11 formed with a plurality of the orifices 10. The jet means B is connected, at the leg 9$a$ of the joint 9, to the lower end of each of the downward tubes 3 of the liquid supply means A by a swivel joint 12 and an elbow 13. The swivel joint 12 has the same construction as one shown in FIG. 3. The drawing shows a case in which a T-shaped joint is used as the joint 9 with a pair of swivel tubes 11 fitted therein. Alternatively, an L-shaped joint may be used along with one swivel tube 11. The arrangement is such that when seen in the plan view the axis U of the horizontal line comprising the leg 9$a$ of the joint 9, the swivel joint 12 and the horizontal tube 13$a$ of the elbow 13 intersects the axis V of the horizontal tube 2 of the liquid supply means A. The angle W formed by the axes U and V may preferably be not greater than 30 degrees, most preferably about 5 to 15 degrees. If the angle is smaller than 5 degrees, there arises a tendency that the reaction force produced by a jet of the liquid can not act satisfactorily on the horizontal tube 2 in causing rotation, whereas an angle in excess of 30 degrees is objectionable since it becomes more difficult to direct the orifices 10 in the swivel tube 11 toward the fruit tree $a$. The orifices 10 in the swivel tube 11 is in facing relation to the fruit tree $a$ and also directed toward the direction opposite to that of the rotation of the swivel tube 11 so as to rotate the swivel tube 11. Moreover, in order to cause the reaction force of the discharged liquid to act as a torque for driving the horizontal tube 2, the orifices 10 are inclined slightly backward with respect to a plane Y including both axis U of the horizontal line and axis X of the swivel tube 11 (FIG. 2). Thus, throughout this specification and appended claims, the expression that the orifices 10 are opened or directed toward the direction opposite to that of rotation of the swivel tube 11 means that the orifices are inclined in such position. Generally, this inclination angle Z is in the range of 5 to 30 degrees. An angle smaller than 5 degrees results in a tendency that the reaction force will not be fully utilized as the torque for the swivel tube 11 and the horizontal tube 2, while if the angle exceeds 30 degrees it becomes more difficult to bring the orifices 10 into facing relation to the fruit tree $a$, hence undesirable. In order to allow the energy of the discharged liquid to act as the torque for rotating the swivel tube 11 and the horizontal tube 2 in this embodiment, it is required that:

(1) The orifice 10 be opened in the direction opposite to that of rotation of the swivel tube 11, and (2) The plane formed by the track of the axis X of the swivel tube 11 do not intersect the axis V of the horizontal tube 2 at a right angle.

Insofar as the above requirements are fulfilled, the illustrated embodiment can be modified in various modes.

In the present apparatus of the foregoing construction, the liquid is forced into the lower end of the vertical tube 1 from unillustrated supply means through the liquid conduit 8 and the liquid is then divided into horizontal tubes 2 at the upper end of the vertical tube 1. Through each of the downward tubes 3 and each horizontal line, the liquid reaches the jet means B, where it is further divided and spread out against the fruit tree $a$ from the orifices 10 in the swivel tubes 11.

At this time, jets of liquid from the orifices 10, due to the reaction, cause the swivel tubes 11 to rotate about the swivel joint 12 in the direction opposite to that of the discharged liquid. The reaction force of the discharged liquid further provides a torque for the horizontal tubes 2 of the liquid supply means A, causing the tubes 2 to rotate about the swivel joint 4. Thus, the liquid forced into the liquid supply means A is spread out over the fruit tree $a$ from inclined orifices 10 which move along a circular track, with the result that the liquid is poured upward and downward in all directions including horizontal directions. Thus in highly three-dimensional manner, the liquid can be applied with uniformity over the entire tree $a$ as well as onto both front and rear faces of the leaves. Further because the horizontal tubes 2 of the liquid supply means A and the swivel tubes 11 of the jet means B are rotated by the reaction of the jets of discharged liquid, there is no need to employ a special device for driving these tubes 2 and 11, this ensuring the advantage that the present apparatus is simple in its overall structure as seen in FIGS. 1 to 5 and very easy to manufacture at a low cost.

A detailed description will now be given with reference to another embodiment shown in FIGS. 5 to 13 which is exactly the same as the foregoing embodiment except that the jet means of this embodiment comprises a sprinkler B' of the auto-directional type adapted for repeated pivotal movement such as one disclosed in Japanese patent publication No. 15,230/1966.

The structure of the sprinkler B' will be described in detail below. The sprinkler B' principally comprises a stationary support cylinder 20 to be fixed to a liquid supply tube in screw-thread engagement therewith, a rotary tube 24 rotatably inserted in the support cylinder 20 and water-tightly sealed by packings 22 and 23 loaded with a spring 21, and a head member 25 mounted on the upper end of the rotary tube 24 in screw-thread engagement and adapted to be moved integrally therewith. The head member 25 is provided with a nozzle 26 having its orifice directed obliquely forward and a gate-like frame 27 formed at its upper end and including a fixed pivot 28 on which a swing member 29 is pivotally mounted. The swing member 29 has a liquid receiver 30 at the side of the nozzle 26 and a weight 31 at the opposite side. The base portions of the receiver 30 and weight 31 are always pressed against the frame members 27$a$ of the gate-like frame 27 by means of a spring 32.

Figure 10:
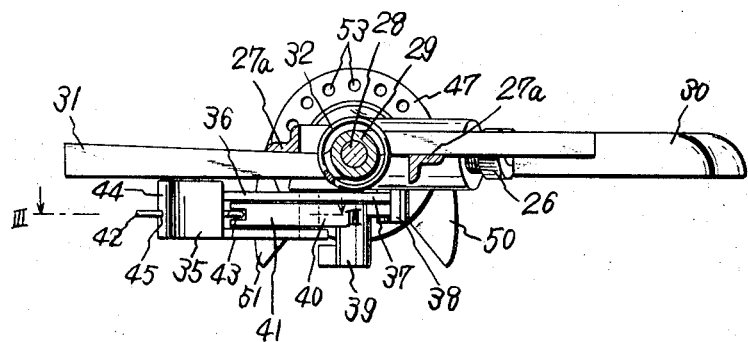
FIG. 10 is plan view in cross section taken along the line II—II in FIG. 9.

When a liquid is forced out from the nozzle 26, the liquid strikes the inner face of the receiver 30 to impart a torque thereto, with the result that swing member 29 is displaced in a counterclockwise direction in FIG. 10 against the action of the spring 32, the angular displacement being such that the swing member 29 is brought to a position where the torque comes into balance with the repelling elastic force of the spring 32. Upon reaching this position, the swing member 29 is immediately pulled back by the spring 27 and urged into hitting contact with the side faces of the frame members 27a due to the inertia of motion of the receiver 30 and the weight 31 on the opposite ends of the swing member 29. As a result, the frame 27 is rotated a small angle in the clockwise direction. Thus, each stroke of the pivotal motion of the swing member 29 rotates the head member 25 a small angle and the direction of liquid discharge is progressively shifted in the clockwise direction so as to achieve liquid application over a wide angle.

Figure 8:
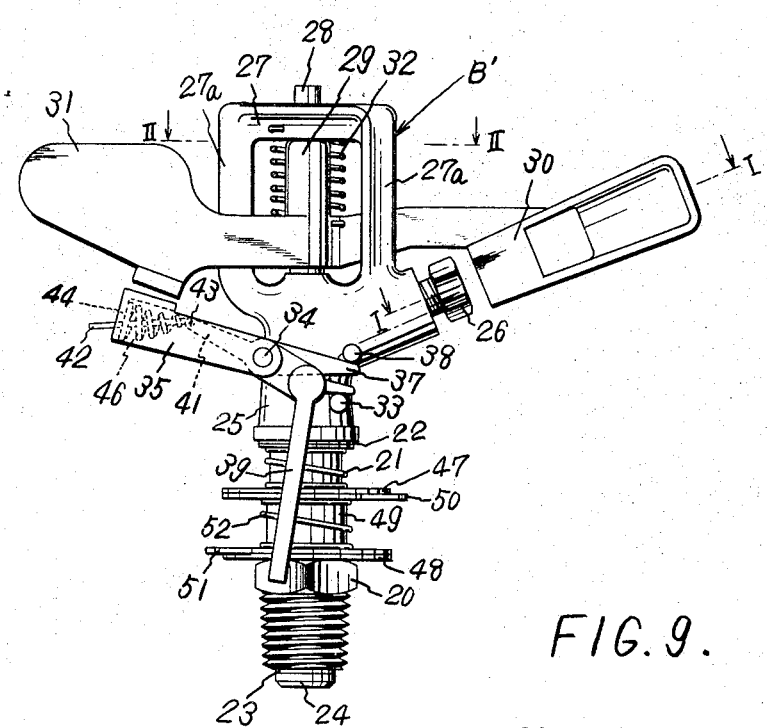
FIG. 8 is a front view of a sprinkler used in the same embodiment.
Figure 9:
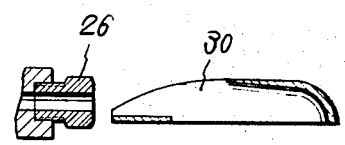
FIG. 9 is a view in vertical section taken along the line I—I in FIG. 8.

When the head member 25 has been completely displaced a predetermined angle toward the clockwise direction, the head member 25 is returned to the original position by a mechanism described below. A pivoted frame 35 is supported at its one end on a short pivot 34 implanted in the boss portion on the side of the head member 25. When the pivoted frame 35 is at a low position, the upper face of the frame 35 is located slightly below the under end of the weight 31 and the distal end of an extension 37 extending from a inner side wall 36 of the pivoted frame 35 is in contact with a projection 38 on the side face of the head member 25. Further mounted on the short pivot 34 within the pivoted frame 35 is a bush portion 40 formed at the upper end of an L-shaped lever 39. Extending from the bush portion 40 is a lever 41 which carries, at its distal end, a flanged pin 42 attached thereto by a pin 43. The other end of the flanged pin 42 extends outwardly through a hole 45 in an outer end wall 44 of the pivoted frame 35. A compression spring 46 is wound around the flanged pin 42. When the L-shaped lever 39 is located at the position illustrated in FIG. 8, the pinned-up portion 43 is at an elevated position, so that a component of the force of the compression spring 46 acting on the outer end wall 44 pushes the same downward and retains the pivoted frame 35 in such position that the upper face of the frame is free from engagement with the lower end of the weight 31 as seen in FIG. 8. Indicated at 33 is a projection for limiting the pivotal movement of the L-shaped lever 39. In the abovementioned position, the swing member 29 is free to move and the head member 25 will be rotated a small angle every time the swing member 29 hits the gate-like frame 27 as already described.

Figure 11:
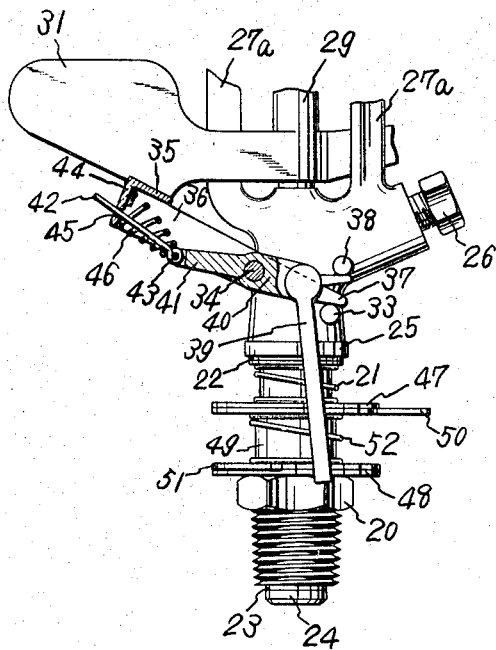
FIG. 11 is a side elevation in vertical section taken along the line III—III in FIG. 10.
Figure 12:
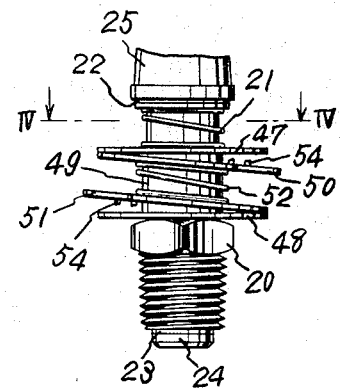
FIG. 12 is a front view showing reverse lever means for controlling the sprinkling angle.
Figure 13:
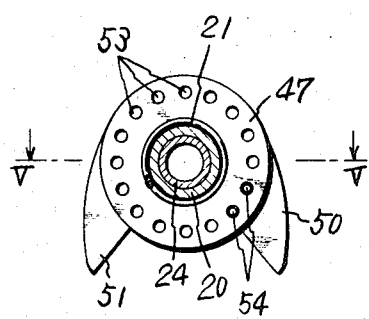
FIG. 13 is a plan view in cross section taken along the line IV—IV in FIG. 12.

When the L-shaped lever 39 is turned in a counterclockwise direction by a reverse lever mechanism to be described below after sprinkling has been completed over a predetermined angle during the rotation of the head member 25, the pinned-up portion 43 of the lever 41 is lowered to direct the flanged pin 42 upward, with the result that the compression spring 46 acts to push up the outer end wall 44 of the pivoted frame 35 as seen in FIG. 11. Consequently, the pivoted frame 35 is moved up to such level that the upper portion of the frame 35 will be hit by the lower end of the weight 31 during its rotation. At this time the distal end of the extension 37 comes into contact with the lower projection 33 to limit an unnecessary upward movement of the pivoted frame 35. Upon the upward movement of the pivoted frame 35, the upper end of the pivoted frame 35 comes to a position where the lower end of weight 31 of the swing member 29 comes into contact therewith, so that the counterclockwise torque given by a jet of liquid is delivered to the head member 25. As a result, the torque thus delivered causes the head member 25 to rotate the head member 25 slidably on the surface of the packing 22 along with the swing member 29 and the pivoted frame 35 and brings the same back to the original position in sprinkling direction, whereupon the reverse lever mechanism functions again to return the L-shaped lever 39 to the position shown in FIG. 8. The swing member 29 is therefore made free to move pivotally. In this manner, the head member 25 will be rotated again a small angle by each stroke of the swing member 29.

Figure 14:
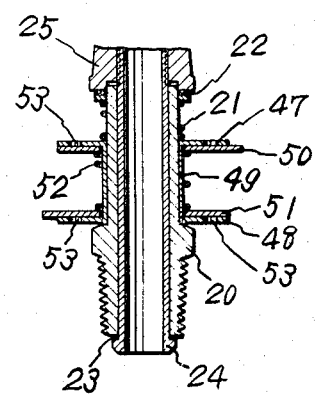
FIG. 14 is a view in vertical section taken along the line V—V in FIG. 13.

The construction of the reverse lever means will be described. It will be seen in FIGS. 12 to 14 that a bush 49 equipped with an upper flange 47 and a lower flange 48 is mounted on the stationary support cylinder 20, the bush 49 further carrying a reverse lever 50 beside the upper flange 47 and another reverse lever 51 beside the lower flange 48 which levers are loosely mounted on the bush 49. A spring 52 is disposed between the levers 50 and 51 in pressing contact therewith. The upper and lower flanges 47, 48 are formed, along their peripheries, with stop perforations 53, while each of the reverse levers 50 and 51 is formed with projections 54 to be fitted into the stop perforations 53. Accordingly, by inclining the reverse lever 50 or 51 against the action of the spring 52 and then fitting the projections 54 into perforations 53 in suitable position, the angle between the levers 50 and 51 can be controlled as desired. The drawing shows this angle as adjusted to about 80 degrees.

The lever 50 included in the reverse lever means serves to rotate the L-shaped lever 39 of the return mechanism in the clockwise direction when the lower end of the lever 39 comes into contact with the lever 50 during the counterclockwise rotation of the head member 25 caused by the impact exerted thereon by the swing member 29. The clockwise rotation of the L-shaped lever 39 permits the pivoted frame 35 to move upward as already described, with the result that the swing member 29 and the head member 25 are allowed to return integrally to the original position in the sprinkling direction. On the other hand, the lever 51 serves to rotate the L-shaped lever 39 in the clockwise direction when the head member 25 is returned to the original position and thereby lower the pivoted frame 35, so as to permit pivotal movement of the swing member 29. Thus the head member 25 is moved in the counterclockwise direction again by the impact of the swing member 29.

Figure 6:
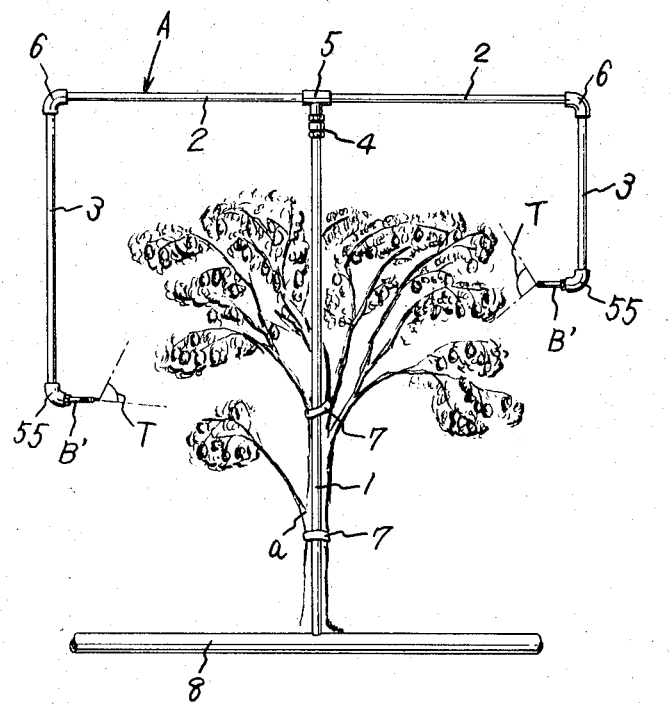
FIG. 6 is a front view of another embodiment of this invention wherein pivotal type jet means is used, the embodiment being shown during operation.

Referring to FIG. 6, the sprinklers B' having the above construction are mounted on the foregoing liquid supply means A, with the stationary support cylinders 20 positioned horizontally and connected to the lower ends of the downward tubes 3 by means of elbows 55, the nozzles 26 of the sprinklers B' being directed toward the tree a. When a liquid is forced out from the nozzles 26, the reaction force of the jet streams of the liquid acts on the horizontal tubes 2 as a torque as apparent in FIG. 7, causing the tubes 2 to rotate about the swivel joints 4 in a counterclockwise direction in FIG. 7 in the same manner as in the previous embodiment. On the other hand, the head member 25 of each of the sprinklers B' is displaced a small angle everytime it is rotated for pivotal reciprocal movement. The angle covered by this reciprocal movement, namely the angle T of the liquid discharge in the vertical direction is generally determined at 70 to 85 degrees although it may vary in accordance with the state of foliage portion of the fruit tree a. (See FIG. 6.)

This embodiment which is capable of discharging a liquid around the tree a while the nozzles are continuously moved up and down also ensures uniform and highly three-dimensional application of the liquid as is the case with the first embodiment. Further since the pivotal movement of the sprinklers B' and the rotation of the horizontal tubes 2 of the liquid supply means A are both effected by utilizing the energy of the liquid discharge, the embodiment can be simplified in its entire structure. Particularly due to the fact that the sprinkler B' is used in this embodiment, the jet means can be positioned close to the foliage portion of the fruit tree a to the greatest possible extent, which assures efficient application of a liquid without a loss.

Although the present invention has been described with respect to the embodiments of such construction that a liquid is discharged inwardly, it is also possible to provide a structure wherein a liquid is sent forth outwardly. An apparatus of such construction may be installed among fruit trees so as to apply the liquid outwardly to the trees surrounding the apparatus.

It will be apparent from the description above that the present apparatus is simple in construction and has a high efficiency in applying to fruit trees water and solutions of agricultural chemicals and the like. The apparatus can also be used in removing insects from the leaves of fruit physically by a jet stream of water.

What I claim is:

1. An automatic sprinkling apparatus comprising:
   (a) a vertical tube (1) connected at its lower end to a source for supplying a liquid to be sprinkled;
   (b) at least one horizontal tube (2) connected to the upper end of said vertical tube and adapted to be rotated about the axis of said vertical tube so as to conduct the liquid from said vertical tube in a horizontal direction;
   (c) at least one downward tube (3) connected to the distal end of said horizontal tube for conducting the liquid downward with jet means (B¹) mounted on the lower end of the said downward tube for forcing out the liquid from said downward tube while being automatically rotated or pivotally moved by the energy of the discharged liquid and causing the reaction force of the discharged liquid to rotate said horizontal tube, including,
   (d) connecting rotary tubing (20, 24) connecting said downward tube (3) and said jet means (B¹);
   (e) a head member (25) mounted on said connecting rotary tubing (24) adapted to be moved integrally therewith;
   (f) a nozzle (26) on the head member, having an orifice directed obliquely forward;
   (g) a gate like frame (27) with frame members (27a) formed at the upper end of the head member, including a fixed pivot (28) with a swing member (29) pivotally mounted thereon;
   (h) a liquid receiver (30) on the swing member at the side of the nozzle (26) and a weight (31) at the opposite side with spring means (32) so that portions of the receiver (30) and weight (31) are always pressed against the frame members (27a) of the gate-like frame (27) by the spring means (32), whereby when a liquid is forced out from the nozzle (26), the liquid strikes the inner face of the receiver (30) to impart a torque thereto, with the result that the swing member (29) is displaced in one direction against the action of the spring means (32), the angular displacement being such that the swing member (29) is brought to a position where the torque comes into a balance with the repelling elastic force of the spring means (32), and upon reaching this position, the swing member (29) is pulled back by the spring means (32) and urged into hitting contact with the frame members (27a) due to the inertia of motion of the receiver (30) and the weight (31) on the opposite ends of the swing member (29), as a result, the frame (27) is rotated a small angle in the opposite direction so that each stroke of the pivotal motion of the swing member (29) rotates the head member (25) a small angle and the direction of liquid discharge is progressively shifted in the opposite direction so as to achieve liquid application over a wide angle.

2. An automatic sprinkling apparatus as claimed in claim 1, including a return mechanism comprising:
   (a) a projection (38) on said head member (25);
   (b) a pivoted frame (35) supported at one end on the side of the head member (25) so that the pivoted frame (35) is at a low position, the upper part of the frame (35) is located slightly below and under the end of the weight (31) and the distal end of said frame (35) is in contact with said projection (38) on the said head member (25);
   (c) an L-shaped lever (39) with an extending portion (40) also pivotally mounted within the pivoted frame (35);
   (d) a lever (41) extending from said extending portion (40) with a flanged pin (42) at its distal end, the end of the flanged pin (42) extending outwardly through a hole (45) in the pivoted frame (35);
   (e) a compression spring (46) wound around the flanged pin (42) so that when the L-shaped lever (39 is in a predetermined position, the force of the compression spring (46) acting on the frame (35) pushes the same downward in such position that the upper part of the frame is free from engagement with the lower end of the weight (31) and in this position, the swing member (29) is free to move and the head member (25) will be rotated a small angle every time the swing member (29) hits the gate-like frame (27).

References Cited
UNITED STATES PATENTS

| | | | |
|---|---|---|---|
| 1,649,179 | 11/1927 | Orr | 239—227 |
| 1,432,479 | 10/1922 | Manu | 239—251 X |
| 1,846,395 | 2/1932 | Huffaker | 239—251 X |
| 2,440,161 | 4/1948 | Vaudreuil | 239—227 |

FOREIGN PATENTS

| | | | |
|---|---|---|---|
| 735 | 1/1901 | Great Britain | 239—243 |
| 1,965,345 | 12/1969 | Germany | 239—243 |

ALLEN N. KNOWLES, Primary Examiner

U.S. Cl. X.R.

239—227, 261, 244, 264, 279